United States Patent Office 2,759,947

Patented Aug. 21, 1956

2,759,947

PREPARATION OF AMINO MERCAPTO 1,3,4-THIADIAZOLES

John Song, North Plainfield, and Gilmer Trower Fitchett, Plainfield, N. J., assignors to American Cyanamid Company, New York, N. Y., a corporation of Maine No Drawing. Application October 27, 1955, Serial No. 543,278

3 Claims. (Cl. 260—306.8)

This invention relates to the preparation of 2-amino-5-mercapto-1,3,4-thiadiazoles from N,N'-bis-(thiocarbamyl)-hydrazines by the action of hydrochloric or hydrobromic acid in the presence of hypophosphorous acid.

2-amino-5-mercapto-1,3,4-thiadiazoles are useful in the preparation of pharmaceutical compounds and serve as intermediates for many useful chemicals. Specifically, these compounds are useful in the preparation of heterocyclic sulfonamides such as described in U. S. Patent 2,554,816 to Clapp and Roblin, Heterocyclic Sulfonamides and Methods of Preparation Thereof.

2-amino-5-mercapto-1,3,4-thiadiazoles can be acylated, by acetic anhydride and then treated with chlorine to form the sulfonyl chloride. By treatment of the product with ammonia, 2-acetylamino-1,3,4-thiadiazole-5-sulfonamides may be obtained. Related intermediates yield analogous final products.

Various methods have been described in the literature for the production of 2-amino-5-mercapto-1,3,4-thiadiazoles. One method of the preparation has been from thiosemicarbazide and carbon disulfide as described in U. S. Patent 2,708,670 to Horclois et al., Preparation of a Thiadiazole Compound.

It has been known for a long time that hydrazine or an acid salt of hydrazine, such as the sulfate, would react with an ammonium or alkali metal thiocyanate or with an isothiocyanate ester to form a N,N'-bis-(thiocarbamyl)-hydrazine. This hydrazine when reacted in the presence of an aqueous solution of hydrochloric or hydrobromic acid forms a 2-amino-5-mercapto-1,3,4-thiadiazole by ring closure. The selection of a particular N,N'-bis-(thiocarbamyl)-hydrazine results in various 2-amino-5-mercapto-1,3,4-thiadiazoles. With the unsubstituted N,N'-bis-(thiocarbamyl)-hydrazine the product obtained is 2-amino-5-mercapto-1,3,4-thiadiazole. With other N,N'-bis-(thiocarbamyl)-hydrazines, the corresponding 2 - amino - 5 - mercapto - 1,3,4 - thiadiazoles are formed.

A text by L. L. Bambas, "The Chemistry of Heterocyclic Compounds," Interscience Publishers, Inc., New York, 1952, discloses the production of 2-amino-5-mercapto-1,3,4-thiadiazole; 2-methylamino-5-mercapto-1,3,4-thiadiazole; and 2-ethylamino-5-mercapto-1,3,4-thiadiazole. Other inert substituents on the N,N'-bis-(thiocarbamyl)-hydrazine give analogous amino-mercapto-1,3,4-thiadiazoles. Actually, the 2-amino-5-mercapto-1,3,4-thiadiazoles have been reported as tautomers with several forms. Three different forms of 2-amino-5-mercapto-1,3,4-thiadiazole with different melting points (245° C., 232° C., 224° C.) are listed by Bambas, page 149. The tautomers have been explained in part by the migration of groups from the mercapto or amino group to the ring nitrogens, to give tautomeric thiadiazolidines, or thiadiazolines, or bridge structures. Hydrogen migrates much more readily than heavier groups.

In the ring closure, triazoles, and 2,5-diamino-thiadiazoles as well as the presently desired 2-amino-5-mercapto-1,3,4-thiadiazoles are possible. The reaction conditions determine the proportion.

While this general type of ring closing reaction has been used and frequently referred to in the literature, the exact mechanism is not certain. By way of illustration, but not limitation, it might be considered that a proton attaches to a thiocarbamyl sulfur resulting in a mercapto group adjacent a carbonium ion. This would then cyclize by sharing a pair of electrons from the other thiocarbamyl sulfur to give a 2-amino-5-amino-5-mercapto$\Delta^2$-thiadiazoline. At this point a hydrogen from the 4 position and one of the substituents from the 5 position would be eliminated.

In the past, both an ammonia or amine molecule and a hydrogen sulfide molecule have been eliminated giving in one case a 2-amino-5-mercapto-1,3,4-thiadiazole, and in the other case a 2,5-diamino-1,3,4-thiadiazole. The yields would appear to indicate that the two routes are competitive and apparently about equally productive.

Obviously when one product alone is desired, a reaction in which half of the starting material forms a by-product is not an efficient procedure.

We have found that by conducting this reaction in the presence of from 0.05 to 30 parts, preferably about 0.60 to 2.0 parts, of hypophosphorous acid per 100 parts by weight of the N,N'-bis-(thiocarbamyl)-hydrazine, the reaction is shifted markedly in favor of the elimination of ammonia or an amine with the concomitant marked increase in efficiency of production of the desired 2-amino-5-mercapto-1,3,4-thiadiazole. The hypophosphorous acid may be formed in the acid reaction mixture from a salt of hypophosphorous acid and the added hydrohalide acid. By the use of the small amount of hypophosphorous acid, the yields of the 2-amino-5-mercapto compounds which are commonly in the neighborhood of 30 to 35% are increased to 60% or more. Additionally, the final product is sufficiently pure that upon crystallization from the reaction mixture, a product is obtained which without further purification may be used as the starting material for other processing steps which may include acylation of the amino group or oxidation of the mercapto group. By eliminating the production of undesired by-products and thus increasing the yields, and by the immediate production of a comparatively pure final product which does not require additional purification for subsequent use, the operating efficiency of the production of such final products as 2-acetylamino-1,3,4-thiadiazole-5-sulfonamide is increased.

The closure of the ring occurs in the presence of hydrochloric or hydrobromic acid. From about 1- to 12-normal acid may be used, but from 2- to 4-normal is a preferred operating range. Higher temperatures favor the reaction, so temperatures of from about 90° C. to reflux are conveniently commercially used.

*Example 1*

A mixture of 198 parts of concentrated hydrochloric acid and 50 parts of a ½% solution of hypophosphorous acid is diluted to a total of 800 parts by volume with water. This acidic solution is heated to a temperature of about 98° C. and 40 parts of N,N'-bis-(thiocarbamyl)-hydrazine is added. The mixture is heated between 100° C.–104° C. (reflux) until the reaction is substantially complete. After cooling to room temperature, the crystals which form are removed by filtration, washed with water, and dried at about 90° C. A yield of 25.7 grams (72.5% of theoretical) of 2-amino-5-mercapto-1,3,4-thiadiazole is obtained. An ultra-violet analysis (at 310 millimicrons) showed the product to be 98.3% pure. The product melted between 229.5° C. and 229.7° C., uncorrected.

*Example 2*

A mixture of 300 parts of concentrated hydrochloric acid and 50 parts of a ½% solution of hypophosphorous acid is diluted with 500 parts of water. The solution is heated to about 85° C. and 40 parts of N,N'-bis(thiocarbamyl)-hydrazine is added. The mixture is heated to a temperature of about 100° C. to 105° C. (reflux) until the reaction is substantially complete. After cooling to room temperature, the crystals are removed by filtration, washed with water, and dried at about 90° C. A yield of 28.2 grams 2-amino-5-mercapto-1,3,4-thiadiazole results. This is 79.4% of theoretical, and the product is 98.8% pure.

*Example 3*

The procedure of Example 1 is followed, except that 200 parts of ½% hypophosphorous acid is used and the acid mixture is diluted with water to 600 parts by volume. A high yield of a pure product results.

*Example 4*

The procedure of Example 1 is followed, except that the hydrochloric acid is diluted with 850 parts of ½% hypophosphorous acid, with no further dilution. A high yield of a pure product results.

*Example 5*

A mixture of 246 parts by volume of 36% hydrochloric acid, and 140 parts by volume of a ½% aqueous solution of hypophosphorous acid is diluted to a volume of 800 parts with water. This solution is heated to 85° C., and 40 parts by weight of N,N'-bis-(thiocarbamyl)-hydrazine is added with stirring. The mixture is held at 85° C. for about 30 minutes and then heated to reflux until the reaction is complete. The reaction mixture is then cooled to 20° C., and the thus formed 2-amino-5-mercapto-1,3,4-thiadiazole is filtered out, washed with water until acid-free, and then dried. A yield of 28.3 parts by weight analyzing 98.8% pure by ultra-violet analysis is obtained. This represents a yield of 78.3% of the theoretical yield.

*Example 6*

The procedure of Example 5 is followed except that no hypophosphorous acid is used. A yield of 14.3 parts of a product which analyzed 97.3% 2-amino-5-mercapto-1,3,4-thiadiazole is obtained. This is 39.2% of the theoretical yield. This difference in yield is attributable solely to the absence of the hypophosphorous acid.

We claim:

1. In the preparation of 2-amino-5-mercapto-1,3,4-thiadiazoles by the ring closure of N,N'-bis-(thiocarbamyl)-hydrazines in the presence of a hydrohalic acid selected from the group consisting of hydrochloric acid and hydrobromic acid, the improvement which comprises conducting the ring closure in the presence of from 0.05 to 30 parts of hypophosphorous acid per 100 parts of said N,N'-bis-(thiocarbamyl)-hydrazine.

2. In the preparation of 2-amino-5-mercapto-1,3,4-thiadiazole by the ring closure of N,N'-bis-(thiocarbamyl)-hydrazine, the steps which comprise heating N,N'-bis-(thiocarbamyl)-hydrazine in the presence of 1- to 12-normal hydrochloric acid in the presence of from 0.05 to 30 parts of hypophosphorous acid per 100 parts of N,N'-bis-(thiocarbamyl)-hydrazine.

3. The process of claim 2 in which the hydrochloric acid concentration is from about 2- to 4-normal, and the reaction mixture is heated between about 90° C. and the boiling point.

No references cited.